H. E. LOUDENBECK.
PISTON PACKING.
APPLICATION FILED FEB. 10, 1920.

1,372,760.

Patented Mar. 29, 1921.

INVENTOR
HARRY C. LOUDENBECK
BY Wm. M. Cady
ATTORNEY

UNITED STATES PATENT OFFICE.

HARRY C. LOUDENBECK, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PISTON-PACKING.

1,372,760.

Specification of Letters Patent.   Patented Mar. 29, 1921.

Application filed February 10, 1920.   Serial No. 357,634.

*To all whom it may concern:*

Be it known that I, HARRY C. LOUDENBECK, a citizen of the United States, residing at Pittsburgh, in the county of Allegheny and State of Pennsylvania, have invented new and useful Improvements in Piston-Packings, of which the following is a specification.

This invention relates to packing, and more particularly to piston packing for brake cylinder pistons.

The packing employed in brake cylinder pistons is of the well known hydraulic cup shaped type and is commonly made of leather.

Leather being porous, is subject to leakage, and it is therefore necessary to fill the pores of the leather used for packing with a filler in order to make the packing leak proof.

This filler material is destroyed in time by the action of the lubricating oil or grease used in the brake cylinder for lubricating purposes and also deteriorates when the brake cylinder is subjected to the heat of a hot climate, so that the packing tends to become porous and leaks after the same has been in service for a certain time.

The principal object of my invention is to provide a piston packing in which the above difficulties are avoided.

Figure 1:
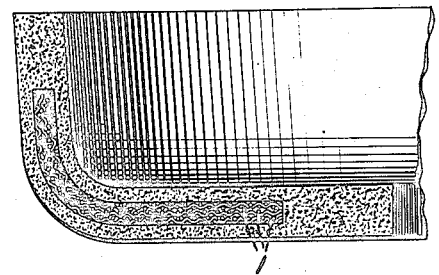
Figure 2:
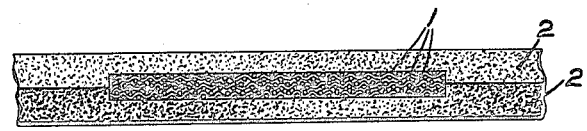
Figure 3:
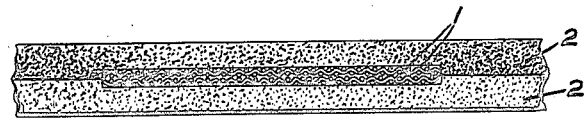

In the accompanying drawing; Figure 1 is a transverse section of a piston packing embodying my invention; Fig. 2 a section of the packing material employed in the Fig. 1 construction, before being formed up; Fig. 3 a section of packing material with two layers of reinforcing fabric; and Fig. 4 a section of packing material with one layer of reinforcing fabric.

According to my invention, the packing is composed of oil proof rubber, which is not affected by lubricating oil or by heat and in order to provide sufficient flexibility to prevent injury from bending a reinforcing fabric combined with soft rubber is inserted, preferably at the angle or bend of the cup shape.

One or more strips of fabric such as duck and preferably cut on the bias, are covered with a skim coating of soft or non-oil proof rubber and the strips are frictioned between strips of oil proof rubber.

The packing material so formed is then placed in a mold and pressed into the cup shape and finally the packing is vulcanized in the mold to form the finished piston packing.

Figure 4:
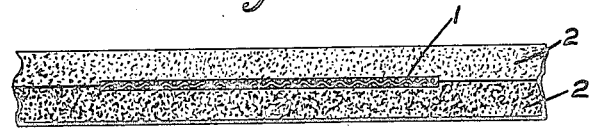

Fig. 2 shows a packing material comprising three strips 1 of frictioned fabric and soft rubber between two strips 2 of oil proof rubber, Fig. 3 two strips of fabric, and Fig. 4 one strip.

A piston packing is thus provided having an oil proof rubber at its exposed parts and a soft reinforcing core of soft rubber and fabric.

Having now described my invention, what I claim as new and desire to secure by Letters Patent, is:—

1. A piston packing composed of oil proof rubber and having a core of soft rubber and fabric.

2. A piston packing composed of oil proof rubber with a core of one or more plies of soft rubber coated fabric.

3. A cup shaped piston packing composed of oil proof rubber having a reinforcement core at the bend in the packing composed of soft rubber and fabric.

4. A cup shaped piston packing composed of oil proof rubber having a reinforcement core at the bend in the packing composed of one or more layers of fabric coated with soft rubber.

In testimony whereof I have hereunto set my hand.

HARRY C. LOUDENBECK.